(12) United States Patent
Kinney et al.

(10) Patent No.: US 10,929,146 B2
(45) Date of Patent: Feb. 23, 2021

(54) DYNAMIC TIMER ADJUSTMENT TO IMPROVE PERFORMANCE AND INHIBIT LIVELOCK CONDITIONS

(71) Applicant: Intel Corporation, Santa Clara, CA (US)

(72) Inventors: Michael Kinney, Olympia, WA (US); Michael Rothman, Puyallup, WA (US); Vincent Zimmer, Federal Way, WA (US); Mark Doran, Olympia, WA (US)

(73) Assignee: Intel Corpoartion, Santa Clara, CA (US)

( * ) Notice: Subject to any disclaimer, the term of this patent is extended or adjusted under 35 U.S.C. 154(b) by 150 days.

(21) Appl. No.: 15/966,805

(22) Filed: Apr. 30, 2018

(65) Prior Publication Data
US 2019/0042274 A1  Feb. 7, 2019

(51) Int. Cl.
| | |
|---|---|
| *G06F 9/4401* | (2018.01) |
| *G06F 11/30* | (2006.01) |
| *G06F 11/00* | (2006.01) |
| *G06F 1/14* | (2006.01) |
| *G06F 9/48* | (2006.01) |

(52) U.S. Cl.
CPC .............. *G06F 9/4403* (2013.01); *G06F 1/14* (2013.01); *G06F 9/4401* (2013.01); *G06F 9/4818* (2013.01); *G06F 9/4825* (2013.01); *G06F 11/004* (2013.01); *G06F 11/30* (2013.01)

(58) Field of Classification Search
CPC ...................................................... G06F 9/4403
See application file for complete search history.

(56) References Cited

U.S. PATENT DOCUMENTS

| | | | |
|---|---|---|---|
| 2007/0033388 A1* | 2/2007 | Zhou | G06F 9/4401 713/2 |
| 2012/0254492 A1* | 10/2012 | Li | G06F 13/24 710/269 |

OTHER PUBLICATIONS

"Unified extensible firmware interface forum", uefi.org, Retrieved on Mar. 14, 2018, 3 pages.

* cited by examiner

*Primary Examiner* — Kim Huynh
*Assistant Examiner* — Eric Chang
(74) *Attorney, Agent, or Firm* — Jordan IP Law, LLC

(57) ABSTRACT

An embodiment of a semiconductor package apparatus may include technology to determine respective priority levels for one or more boot time events, determine an amount of execution time for the one or more boot time events, and automatically adjust a timer based on the amount of execution time and the priority levels for the one or more boot time events. Other embodiments are disclosed and claimed.

21 Claims, 10 Drawing Sheets

DYNAMIC TIMER ADJUSTMENT TO IMPROVE PERFORMANCE AND INHIBIT LIVELOCK CONDITIONS

TECHNICAL FIELD

Embodiments generally relate to system boot processes. More particularly, embodiments relate to dynamic timer adjustment to improve performance and inhibit livelock conditions.

BACKGROUND

In the context of some computing systems, a deadlock may refer to a situation in which two or more processes are unable to proceed because each is waiting for one of the others to do something, such as release a resource. Starvation may refer to a situation in which a process is overlooked indefinitely by the scheduler. A livelock may be similar to a deadlock, except that the states of the processes involved in the livelock may constantly change with regard to one another, but with none progressing. Livelock may also be considered a special case of resource starvation, where the livelocked process is not progressing.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
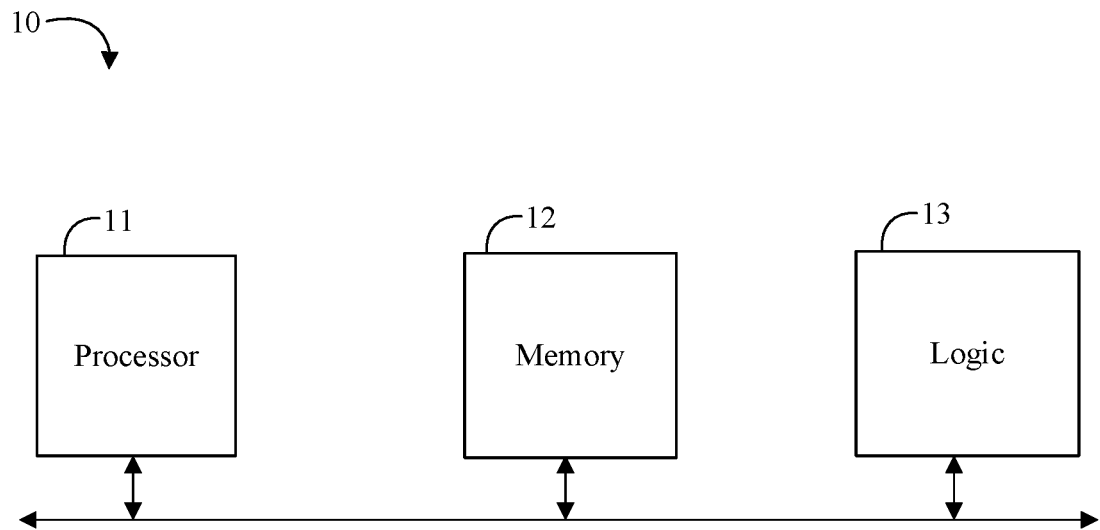
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to determine respective priority levels for one or more boot time events, determine an amount of execution time for the one or more boot time events, and automatically adjust a timer based on the amount of execution time and the priority levels for the one or more boot time events. For example, the logic 13 may be configured to determine if one or more priority levels for the one or more boot time events corresponds to one or more raised priority levels, and adjust a timer interrupt rate based on the amount of execution time for the one or more boot time events with raised priority levels. In some embodiments, the logic 13 may be further configured to determine a percentage of execution time for the one or more boot time events with raised priority levels, and adjust the timer interrupt rate based on a comparison of the determined percentage of execution and one or more thresholds. For example, the logic 13 may be configured to increase the timer interrupt rate if the determined percentage of execution time is below a first threshold, and/or to decrease the timer interrupt rate if the determined percentage of execution time is above a second threshold. In some embodiments, the logic 13 may be further configured to monitor boot time events to identify events with one or more pre-determined event types, measure the execution time for event notification functions associated with the identified events, and determine the percentage of execution time based on the measured execution time over a sample time period. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining respective priority levels for one or more boot time events, determining an amount of execution time for the one or more boot time events, adjusting a timer based on the amount of execution time and the priority levels for the one or more boot time events, etc.).

Figure 2:
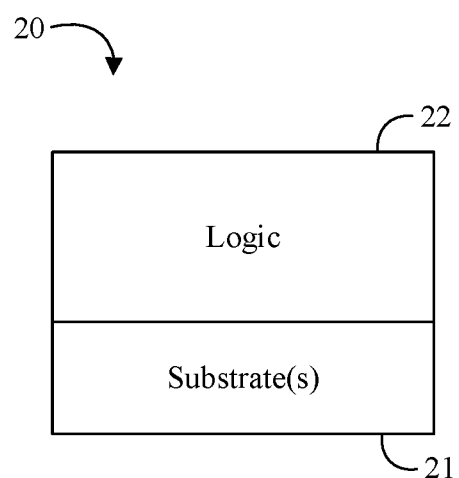
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine respective priority levels for one or more boot time events, determine an amount of execution time for the one or more boot time events, and automatically adjust a timer based on the amount of execution time and the priority levels for the one or more boot time events. For example, the logic 22 may be configured to determine if one or more priority levels for the one or more boot time events corresponds to one or more raised priority levels, and adjust a timer interrupt rate based on the amount of execution time for the one or more boot time events with raised priority levels. In some embodiments, the logic 22 may be further configured to determine a percentage of execution time for the one or more boot time events with raised priority levels, and adjust the timer interrupt rate based on a comparison of the determined percentage of execution and one or more thresholds. For example, the logic 22 may be configured to increase the timer interrupt rate if the determined percentage of execution time is below a first threshold, and/or to decrease the timer interrupt rate if the determined percentage of execution time is above a second threshold. In some embodiments, the logic 22 may be further configured to monitor boot time events to identify events with one or more pre-determined event types, measure the execution time for event notification functions associated with the identified events, and determine the percentage of execution time based on the measured execution time over a sample time period. For example, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
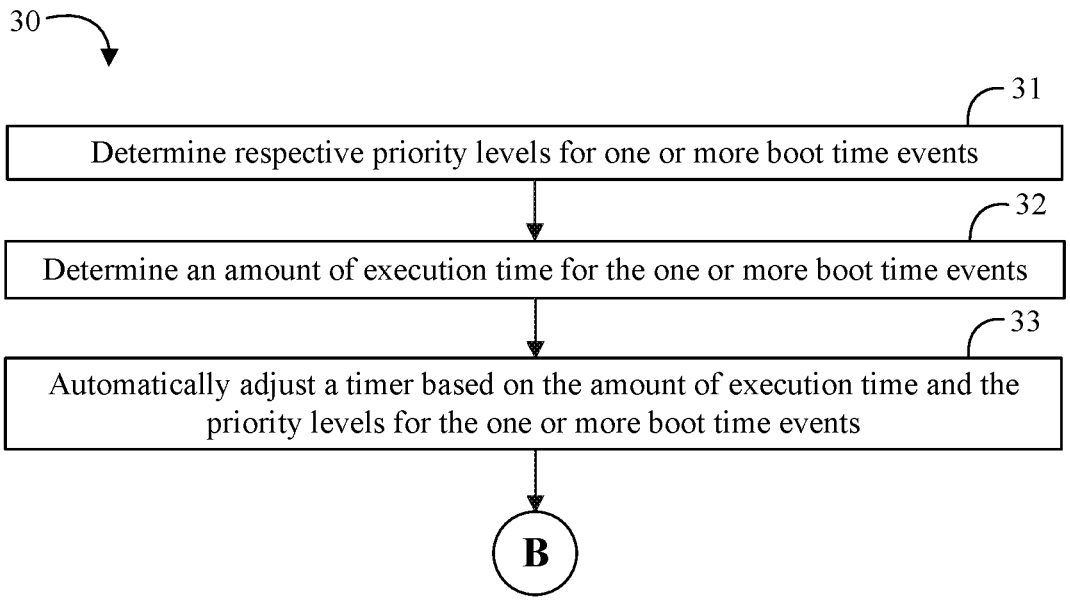
FIGS. 3A to 3C are flowcharts of an example of a method of managing boot events according to an embodiment.
Figure 3B:
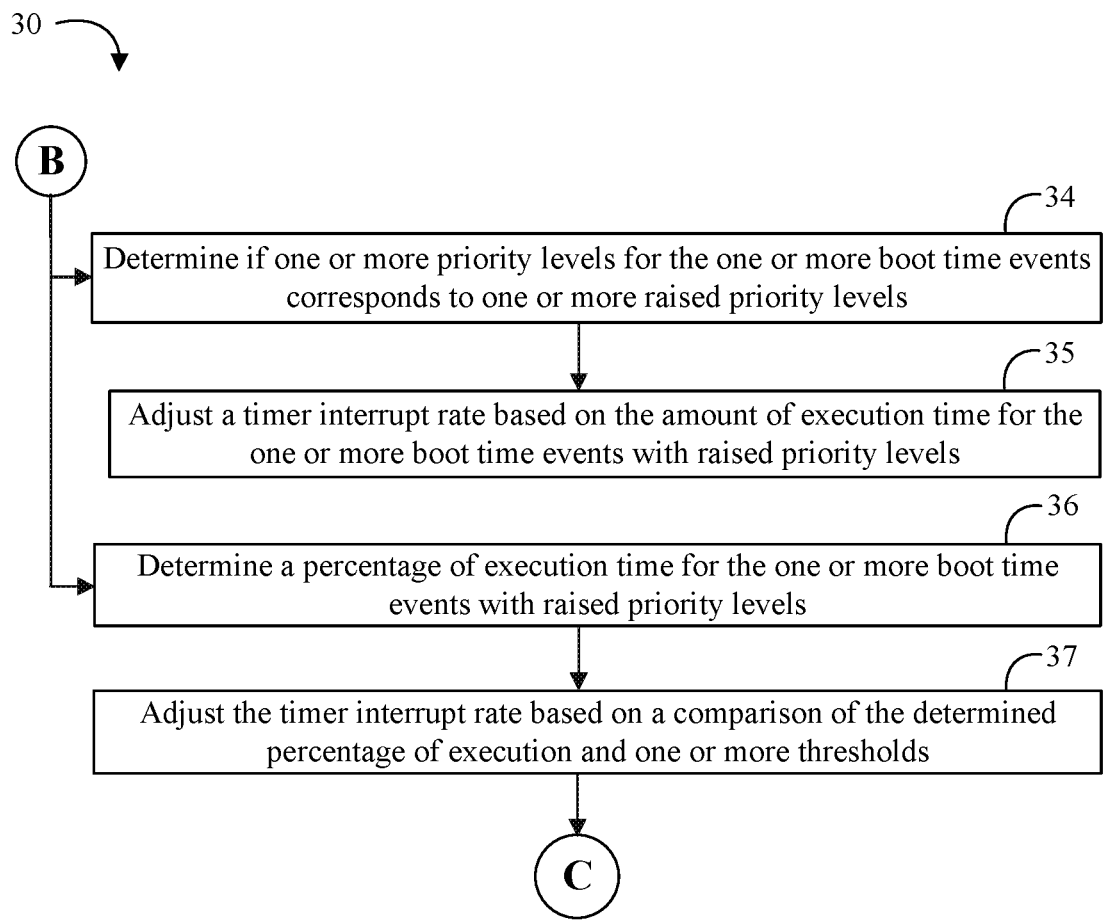
Figure 3C:
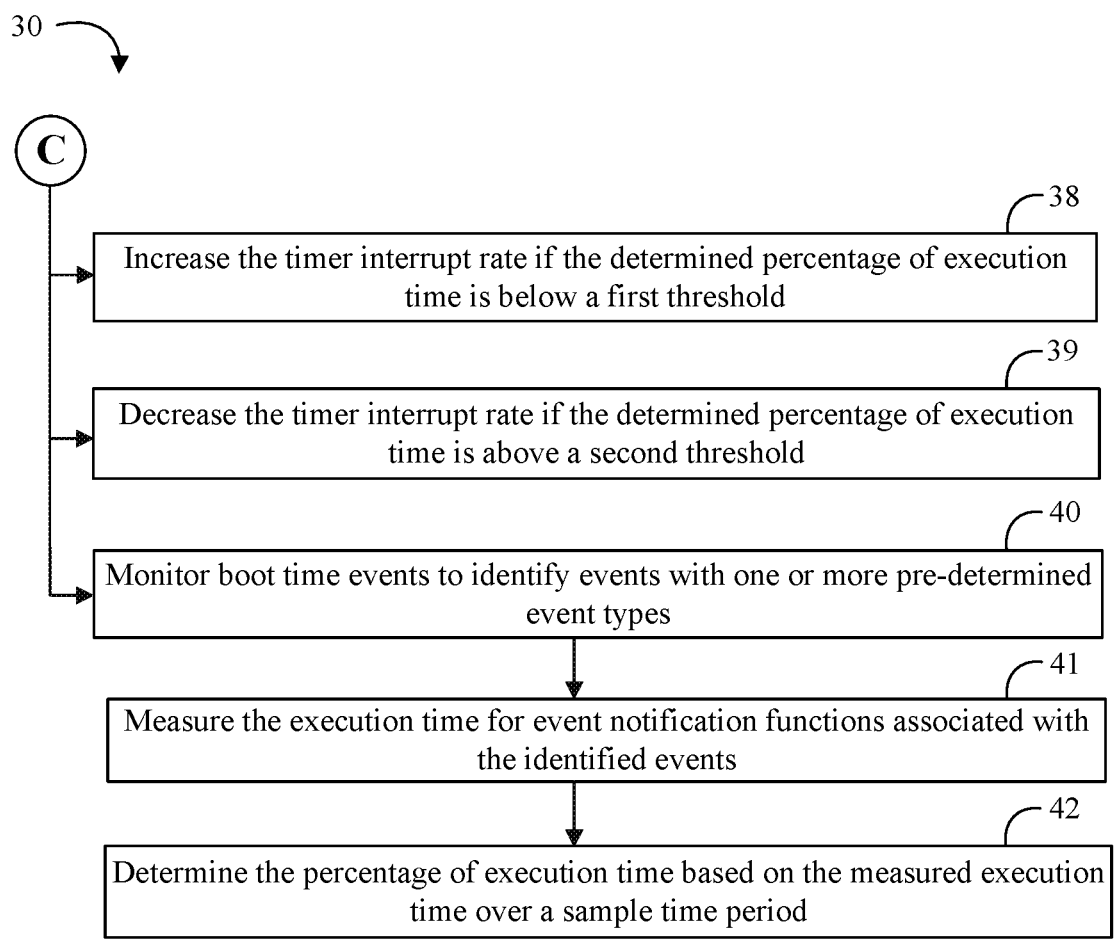

Turning now to FIGS. 3A to 3C, an embodiment of a method 30 of managing boot events may include determining respective priority levels for one or more boot time events at block 31, determining an amount of execution time for the one or more boot time events at block 32, and automatically adjusting a timer based on the amount of execution time and the priority levels for the one or more boot time events at block 33. For example, the method 30 may include determining if one or more priority levels for the one or more boot time events corresponds to one or more raised priority levels at block 34, and adjusting a timer interrupt rate based on the amount of execution time for the one or more boot time events with raised priority levels at block 35. In some embodiments, the method 30 may further include determining a percentage of execution time for the one or more boot time events with raised priority levels at block 36, and adjusting the timer interrupt rate based on a comparison of the determined percentage of execution and one or more thresholds at block 37. For example, the method 30 may include increasing the timer interrupt rate if the determined percentage of execution time is below a first threshold at block 38, and/or decreasing the timer interrupt rate if the determined percentage of execution time is above a second threshold at block 39. Some embodiments of the method 30 may further include monitoring boot time events to identify events with one or more pre-determined event types at block 40, measuring the execution time for event notification functions associated with the identified events at block 41, and determining the percentage of execution time based on the measured execution time over a sample time period at block 42.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS).

Figure 4:
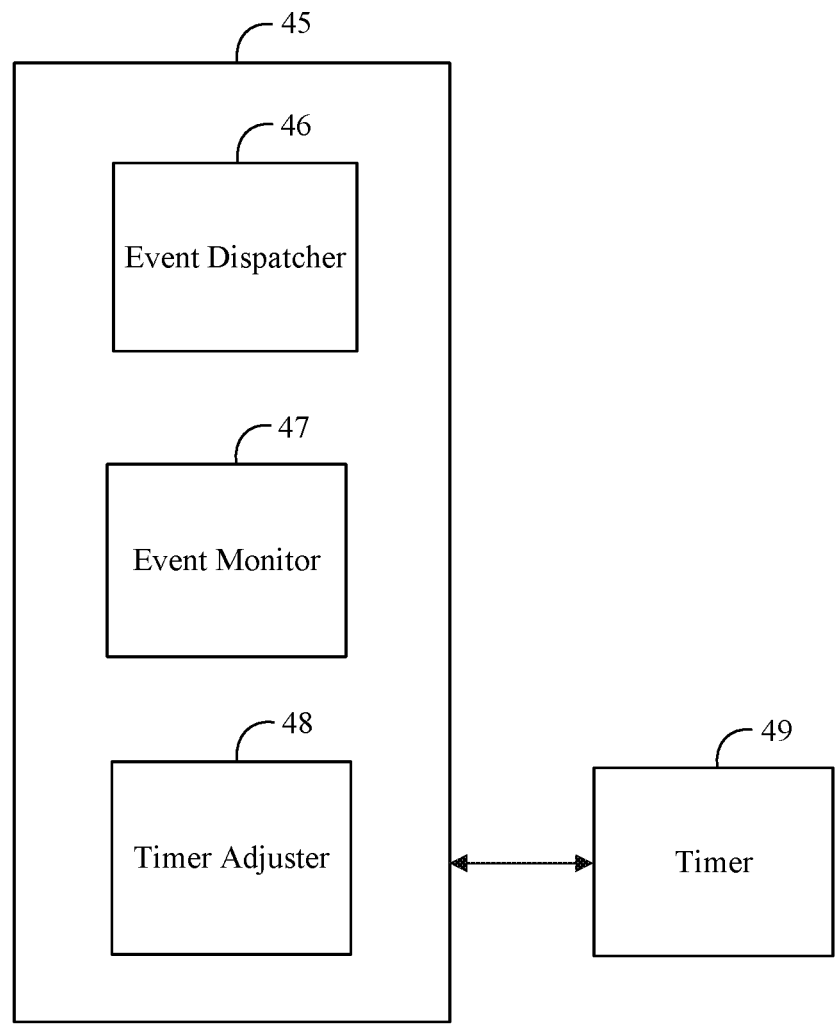
FIG. 4 is a block diagram of an example of boot manager apparatus according to an embodiment.

Turning now to FIG. 4, some embodiments may be physically and/or logically arranged as one or more modules. For example, an embodiment of a boot manager apparatus 45 may include an event dispatcher 46, an event monitor 47, and a timer adjuster 48. The event dispatcher 46 may include technology to dispatch boot time events. The event monitor 47 may include technology to determine respective priority levels for one or more boot time events, and to determine an amount of execution time for the one or more boot time events. The timer adjuster 48 may include technology to automatically adjust a timer 49 based on the amount of execution time and the priority levels for the one or more boot time events, determined by the event monitor 47. For example, the event monitor 47 may be configured to determine if one or more priority levels for the one or more boot time events corresponds to one or more raised priority levels, and the timer adjuster 48 may be configured to adjust a timer interrupt rate of the timer 49 based on the amount of execution time for the one or more boot time events with raised priority levels. In some embodiments, the event monitor 47 may be further configured to determine a percentage of execution time for the one or more boot time events with raised priority levels, and the timer adjuster 48 may adjust the timer interrupt rate based on a comparison of the determined percentage of execution and one or more thresholds. For example, the timer adjuster 48 may be configured to increase the timer interrupt rate if the determined percentage of execution time is below a first threshold, and/or to decrease the timer interrupt rate if the determined percentage of execution time is above a second threshold. In some embodiments, the event monitor 47 may be further configured to monitor boot time events to identify events with one or more pre-determined event types, to measure the execution time for event notification functions associated with the identified events, and to determine the percentage of execution time based on the measured execution time over a sample time period.

Embodiments of the event dispatcher 46, the event monitor 47, the timer adjuster 48, timer 49, and other components of the boot manager apparatus 45, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide dynamic timer support, inhibiting or preventing livelock conditions as well as improving or optimizing performance for bare metal networking scenarios. For example, some embodiments may address some of the scaling issues inherent in a unified extensible firmware interface (UEFI) single-timer-tick interrupt, polled system model via purpose-designed heuristic and autonomics. Specifically, some embodiment may actively prevent a potential livelock condition in firmware for platforms that are conformant with the UEFI specification (www.uefi.org) utilizing a polled driver model.

In some embodiments, a boot manager may be responsible for starting up the OS. For example, the boot manager may present a screen that allows a user/administrator to choose what to boot on a UEFI system. UEFI device drivers may depend on timer-based polling and event mechanisms that may execute at raised priority levels to complete I/O transactions required for the platform to load and boot an operating system. For example, the UEFI specification may define one or more task priority levels (TPLs) including normal priority levels such as TPL APPLICATION (e.g., the priority level at which UEFI images are executed) and TPL CALLBACK (e.g., the priority level for most notification functions), and raised priority levels TPL NOTIFY (e.g., the priority level at which most I/O operations are performed) and TPL HIGH LEVEL (e.g., the priority level for the one timer interrupt supported in UEFI). In other systems (e.g., and/or in future versions of the UEFI specification), other priority levels may be identified and other priority levels may be considered raised priority levels.

Without being limited to theory of operation, if a large enough set of UEFI drivers execute events at raised priority levels, then the normal application priority level may be starved to the point that the platform may livelock and the platform will not be able to complete the load and boot of an OS. For example, a livelock may occur when substantially 100% of the CPU execution cycles are used to process events at raised priority levels, so the CPU instruction pointer for the normal priority level is no longer allowed to make forward progress. The result from a user's perspective may be that the platform hangs in the firmware and will not boot an OS. Advantageously, some embodiments may include technology to monitor the firmware to measure execution time in events at raised priority levels to detect when a potential livelock condition may occur and to actively adjust the hardware timer interrupt rate to prevent a livelock condition during boot. In some embodiments, the adjustments to the timer interrupt rate may go up or down depending on the measurements of execution time at raised priority levels. Some embodiments may also reduce or minimize the overhead of the monitoring and adjustment technology to have little or no increase of the platform boot time. Some embodiments may also not adjust the hardware timer interrupt too often to provide a stable control technique for the timer interrupt rate.

In some embodiments, monitoring technology may be added to an event dispatcher in the UEFI core. Whenever an event notification function for an event of type EVT_NOTIFY_SIGNAL is executed, for example, the execution time of the event notification function may be measured. The measurements may be accumulated over a sample period (e.g., on the order of a few seconds). For each sample period, the percentage of time spent in event notification functions at raised priority levels may then be computed. If the computed percentage is above an established threshold, then the rate of the hardware timer interrupt may be decreased. If the computed percentage is below an established threshold, then the rate of the hardware timer interrupt may be increased. In some embodiments, the sample period and the thresholds may be tuned by a platform firmware developer for specific platform requirements.

For example, if a minimum (MIN) threshold is set at 25%, a maximum (MAX) threshold is set at 50%, and a sample period is set at one (1) second, then the UEFI core may perform a quick check once a second to see if the hardware timer interrupt rate needs to be adjusted. During boot, if the event notification function execution time at raised priority levels exceeds the MAX threshold (e.g., 50%) of the available CPU bandwidth, then the hardware timer interrupt rate will be decreased. With the lower hardware timer interrupt rate, the event notification functions will be called less often, so the CPU load at raised priority levels will be lowered. In this example, 50% of the CPU bandwidth may effectively be reserved for normal priority execution. During boot, if the event notification function execution time falls below the MIN threshold (e.g., 25%) of the available CPU bandwidth, then the hardware timer interrupt rate will be increased. With the higher hardware time interrupt rate, the event notification functions will be called more often, so the CPU load at raised priority levels will be increased. Some UEFI drivers may utilize timer events to poll for input/output (I/O) transaction completion. Some embodiments may advantageously improve performance by running hardware timer interrupts as fast as reasonable to provide good I/O performance to support faster or the fastest possible boot times.

Some other systems may limit the number of devices and/or the number of UEFI drivers loaded during the pre-boot environment. Some other systems may have a platform developer statically set a timer interrupt rate at a worst-case rate to prevent livelock. Limiting the number of devices/drivers may limit the usefulness of the platform and/or the ability to scale-up a platform. Statically setting the timer interrupt to the worst-case rate may negatively impact performance and result in slower boot times. Some embodiments may provide adaptive technology that dynamically changes the hardware timer interrupt rate based on measurements of the CPU execution time at raised priority levels, advantageously inhibiting or preventing livelock while also providing better performance when possible. For example, if the percentage of execution time at raised priority levels is above a threshold, then the hardware time rate is decreased (e.g., preventing livelock), and if the percentage of execution time at raised priority levels is below a threshold, then the hardware timer is increased (e.g., improving performance). Some embodiments may ensure that an OS will boot and may support enterprise scale-up deployments that may utilize all of the boot capabilities of the platform (e.g., a scale-up server with hundreds of I/O devices spread across many racks with cache-coherency between the server trays). Some embodiments may advantageously provide dynamic, adaptive technology to provide improved/optimal boot performance when only a few drivers are executing at raised priority levels and also to inhibit/prevent livelock conditions when large numbers of drivers are executing at raised priority levels. Some embodiments may ensure platform vendors that their platform firmware will not experience a livelock condition when customers add new drivers to the platform.

Figure 5:
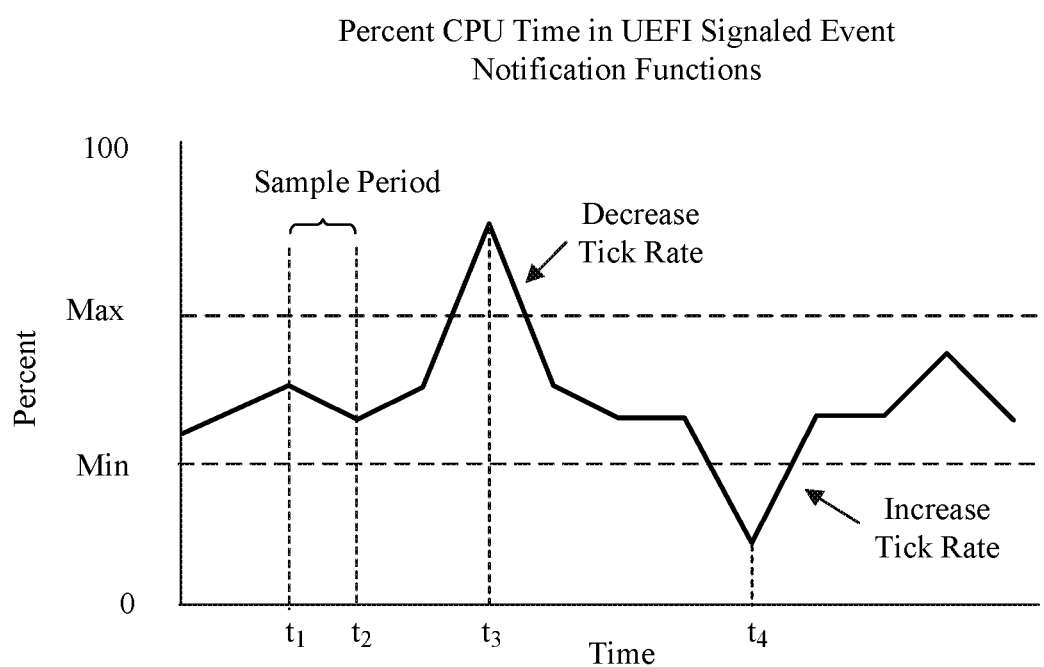
FIG. 5 is an illustrative graph of Percent versus Time according to an embodiment.

Turning now to FIG. 5, an illustrative graph of Percent versus Time shows how a timer may be adjusted in accordance with some embodiments. The Percent axis corresponds to a percentage of CPU time in UEFI signaled event notification functions versus total available CPU time over a sample period (e.g., during a driver execution environment (DXE) phase of the boot). For each sample period, the percentage of execution time may be evaluated and the system timer tick rate may be adjusted. If the measured execution time goes above the MAX threshold, then the system timer tick is decreased. If the measured execution time goes below the MIN threshold, then the system timer tick rate is increased. An example formula for computing the new system time tick rate may be as follows:

$$\text{New Tick Rate} = \frac{(\text{Current Tick Rate}) * ((\text{MIN} + \text{MAX})/2)}{(\text{Measured Percent})} \quad [\text{Eq. 1}]$$

Eq. 1 may multiply the current tick rate by a ratio of the average of the two thresholds and the measured percent of execution time to compute the new tick rate. For example, Eq. 1 may provide a new tick rate which moves the next measured execution time approximately midway between the Min and Max thresholds. In other embodiments, any suitable control techniques, such as a proportional integral derivative (PID), may additionally or alternatively be utilized to select/compute a new tick rate.

As shown in FIG. 5, some embodiments may monitor a percentage of CPU time spent in UEFI signaled event notification functions. For example, over a sample period between time $t_1$ and $t_2$, a measured percentage of CPU time for the UEFI signaled event notifications functions may fall between a Min and Max threshold, and no adjustment may be made to the system timer tick rate. At time $t_3$, the measured percentage of CPU time for the UEFI signaled event notifications functions may go above the Max threshold (e.g., due to more drivers being loaded during a DXE phase of the UEFI boot process). Upon detecting the monitored condition, the system timer tick rate may be decreased and the measured percentage of CPU time for the UEFI signaled event notifications functions may also decrease (e.g., inhibiting a potential livelock condition). At time $t_4$, the measured percentage of CPU time for the UEFI signaled event notifications functions may go below the Min threshold (e.g., due to the slower tick rate, less drivers being loaded, and/or drivers being unloaded during the DXE phase of the UEFI boot process). Upon detecting the monitored condition, the system timer tick rate may be increased and the measured percentage of CPU time for the UEFI signaled event notifications functions may also increase (e.g., improving boot performance).

Figure 6:
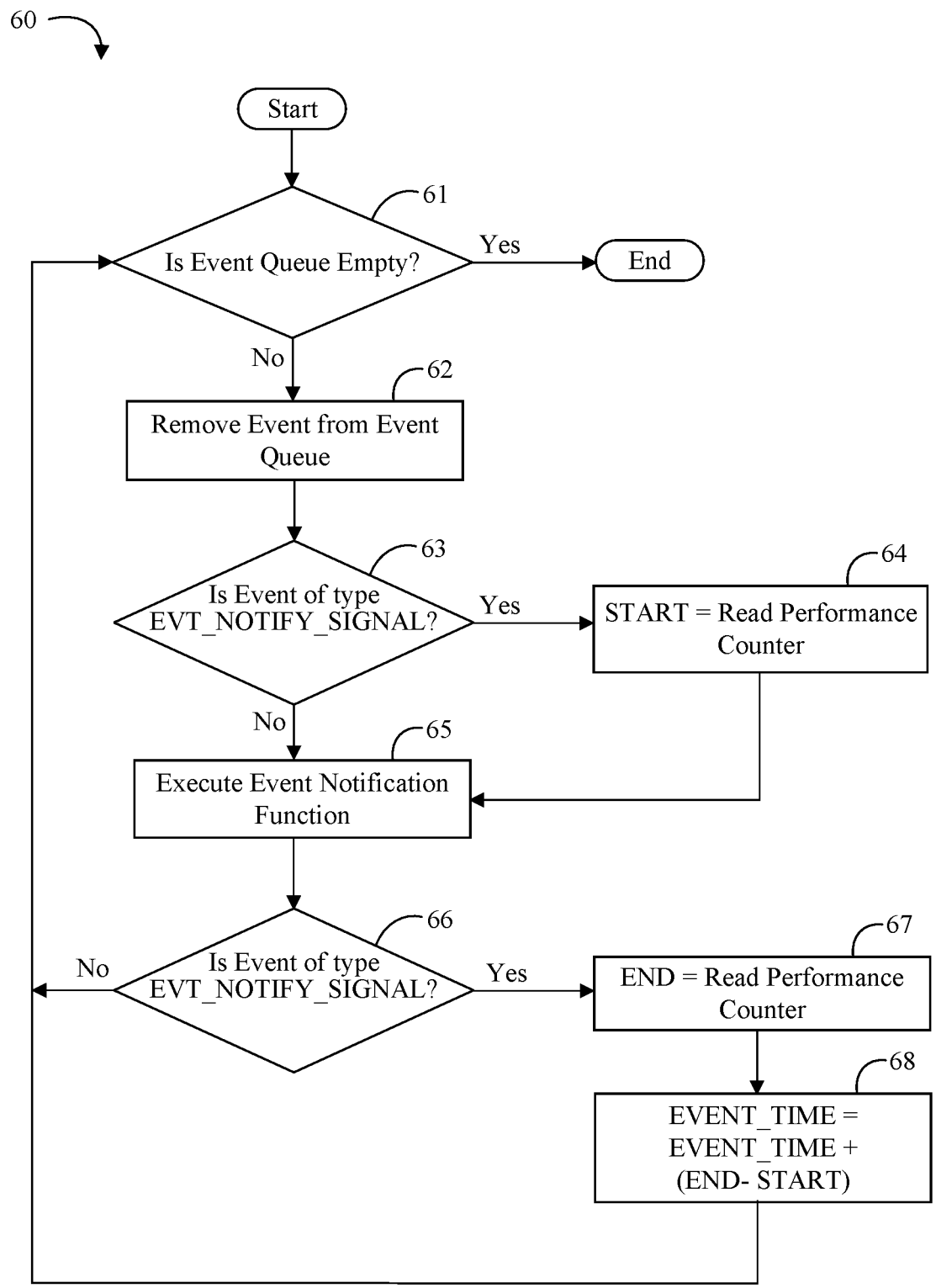
FIG. 6 is a flowchart of an example of a method of dispatching events according to an embodiment.

Turning now to FIG. 6, an embodiment of a method 60 of dispatching events may include determining if an event queue is empty at block 61. If not, the method 60 may remove an event from the event queue at block 62 and determine if the event is of type EVT_NOTIFY_SIGNAL at block 63. For example, a UEFI event dispatcher may include additional technology to accumulate the execution time in event notification functions of type EVT_NOTIFY_SIGNAL (e.g., in other embodiments other types of events may be monitored). The event dispatcher may be responsible for dispatching all signaled events. If the event is of type EVT_NOTIFY_SIGNAL at block 63, then the method 60 may include recording the START time at block 64 (e.g., by reading a performance counter) just before the event notification function is executed at block 65 (other event types may proceed directly to execution at block 65). Immediately after the event notification function returns, if the event is of type EVT_NOTIFY_SIGNAL at block 66, the method 60 may include recording the END time at block 67 (e.g., by reading the same performance counter). For other types of events, the method 60 may return to block 61 to continue until the queue is empty. For events of type EVT_NOTIFY_SIGNAL, after recording the END time at block 67, the method 60 may accumulate the total amount of EVENT_TIME spent in notification functions by adding the difference between the END time and the START time to the accumulated EVENT_TIME at block 68 (e.g., EVENT_TIME=EVENT_TIME+(END−START), after which the method 60 may continue to block 61 until the queue is empty). For example, EVENT_TIME may be reset to zero at the end of each SAMPLE_PERIOD (e.g., see FIG. 7).

Figure 7:
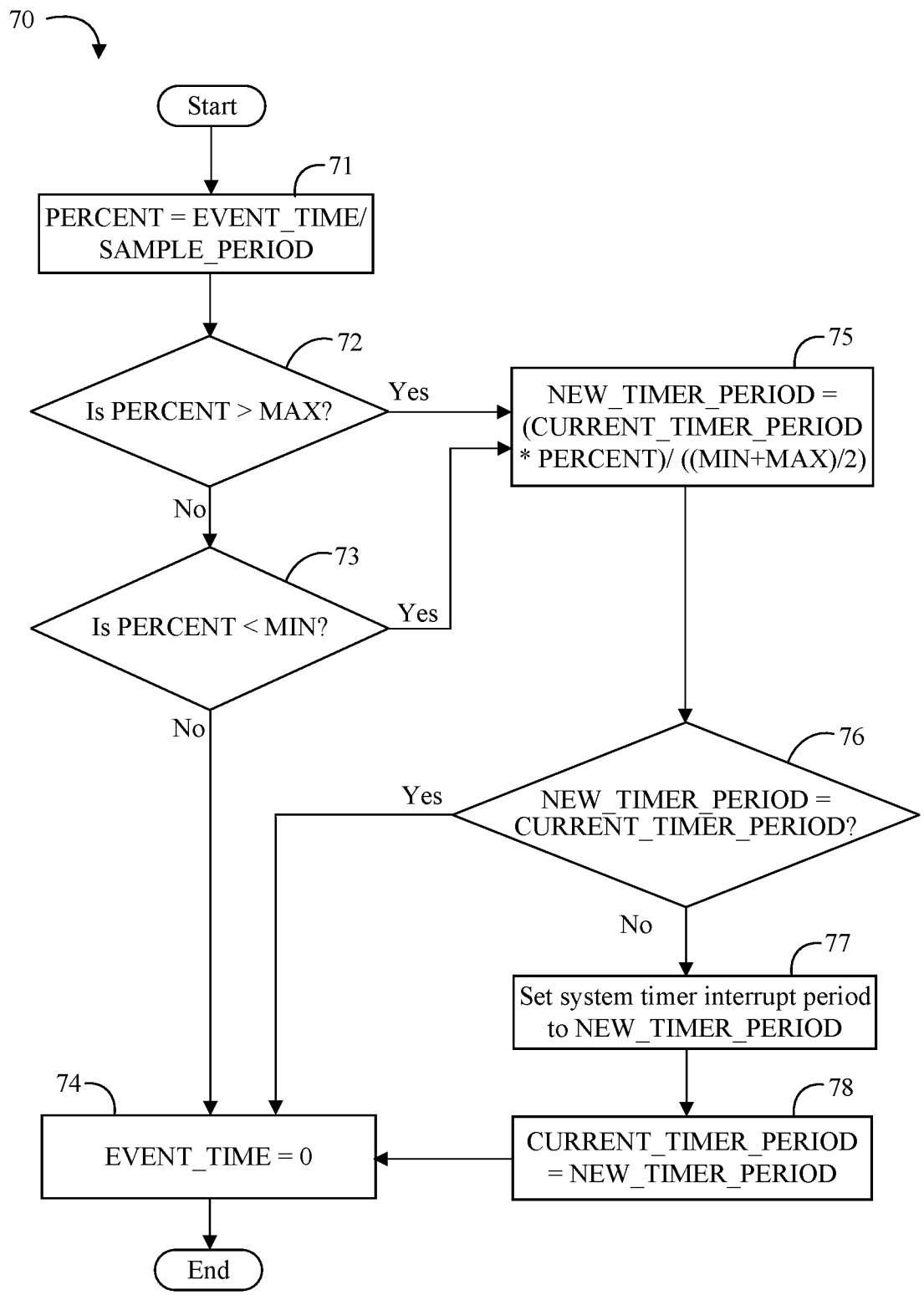
FIG. 7 is a flowchart of an example of a method of adjusting a timer according to an embodiment.

Turning now to FIG. 7, an embodiment of a method 70 of adjusting a timer may execute once per SAMPLE_PERIOD. Any suitable technique may be utilized to perform the method 70 once per SAMPLE_PERIOD. For example, an event ADJUST_TIMER_EVENT, may be inserted in the event queue at suitable intervals. Alternatively, an interrupt may occur every SAMPLE_PERIOD to perform the method 70. The method 70 may include determining a percentage of time spent in a UEFI signaled event notification function by dividing the accumulated EVENT_TIME by the SAMPLE_PERIOD at block 71 (e.g., PERCENT=EVENT_TIME/

SAMPLE_PERIOD). The method 70 may then include determining if the determined PERCENT is greater than a MAX threshold at block 72 or, if not, determining if the determined PERCENT is less than a MIN threshold at block 73. If the determined PERCENT is between the MIN and MAX thresholds, the method 70 may include resetting the accumulated EVENT_TIME to zero (0) at block 74 without adjusting the timer. If the determined PERCENT is greater than the MAX threshold at block 72 or less than the MIN threshold at block 73 (e.g., outside the MIN to MAX range), then the method 70 may include determining a NEW_TIMER_PERIOD at block 75 (e.g., NEW_TIMER_PERIOD= (CURRENT_TIMER_PERIOD*PERCENT)/((MIN+ MAX)/2)). The method 70 may then include determining if the NEW_TIMER_PERIOD is the same as the CURRENT_TIMER_PERIOD at block 76. If so, the method 70 may include resetting the accumulated EVENT_TIME to zero (0) at block 74 without adjusting the timer. Otherwise, the method 70 may include setting a system timer interrupt period to the NEW_TIMER_PERIOD at block 77, setting the CURRENT_TIMER_PERIOD to the NEW_TIMER_PERIOD at block 78, and then resetting the accumulated EVENT_TIME to zero (0) at block 74.

In some embodiments, the method 70 may be triggered by an event that is executed once in every SAMPLE_PERIOD to determine if any adjustments to the system timer tick rate are required. For example, the percent of execution time spent in event notification functions may first be computed, and if that percentage is outside the MIN to MAX range, then a NEW_TIMER_PERIOD may be computed. If the NEW_TIMER_PERIOD is different than the CURRENT_TIMER_PERIOD, then the NEW_TIMER_PERIOD may be used to program the timer interrupt period. Finally, the EVENT_TIME may be set to 0, so a new measurement may be made in the next SAMPLE_PERIOD (e.g., utilizing method 60). In some embodiments, the SAMPLE_PERIOD may also be set to zero (0) accumulated between ADJUST_TIMER_EVENT events such that every SAMPLE_PERIOD is not necessarily identical. Alternatively, SAMPLE_PERIOD_START may be set to the performance counter value when the method 60 starts and SAMPLE_PERIOD_END may be set to the performance counter value when the method 60 ends, with SAMPLE_PERIOD then determined as SAMPLE_PERIOD_END−SAMPLE_PERIOD_START.

Figure 8A:
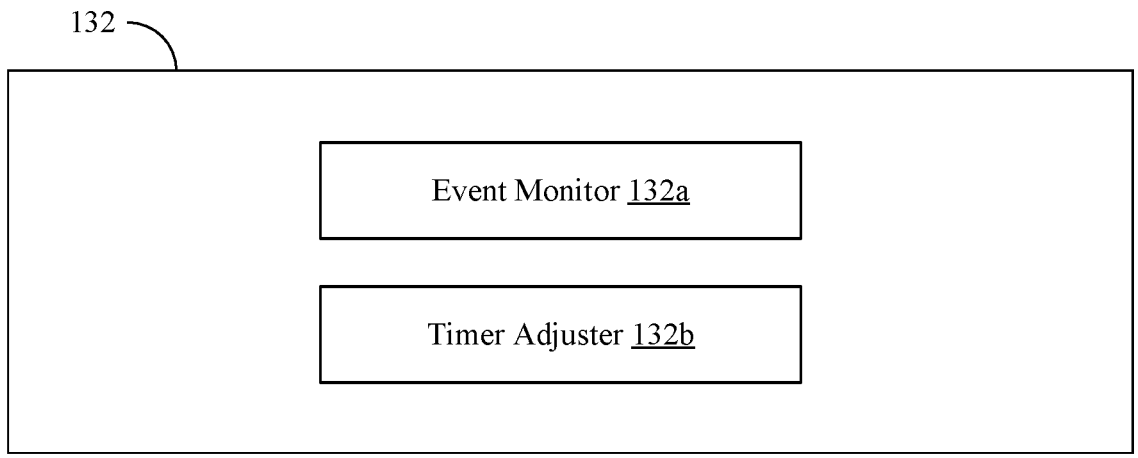
FIGS. 8A and 8B are block diagrams of examples of boot management apparatuses according to embodiments.

FIG. 8A shows a boot management apparatus 132 (132a-132b) that may implement one or more aspects of the method 30 (FIGS. 3A to 3C), the method 60 (FIG. 6), and/or the method 70 (FIG. 7). The boot management apparatus 132, which may include logic instructions, configurable logic, fixed-functionality hardware logic, may be readily substituted for the boot manager apparatus 45 (FIG. 4), already discussed. An event monitor 132a may include technology to determine respective priority levels for one or more boot time events, and to determine an amount of execution time for the one or more boot time events. A timer adjuster 132b may include technology to automatically adjust a timer based on the amount of execution time and the priority levels for the one or more boot time events, determined by the event monitor 132a. For example, the event monitor 132a may be configured to determine if one or more priority levels for the one or more boot time events corresponds to one or more raised priority levels, and the timer adjuster 132b may be configured to adjust a timer interrupt rate of the timer based on the amount of execution time for the one or more boot time events with raised priority levels. In some embodiments, the event monitor 132a may be further configured to determine a percentage of execution time for the one or more boot time events with raised priority levels, and the timer adjuster 132b may adjust the timer interrupt rate based on a comparison of the determined percentage of execution and one or more thresholds. For example, the timer adjuster 132b may be configured to increase the timer interrupt rate if the determined percentage of execution time is below a first threshold, and/or to decrease the timer interrupt rate if the determined percentage of execution time is above a second threshold. In some embodiments, the event monitor 132a may be further configured to monitor boot time events to identify events with one or more pre-determined event types, to measure the execution time for event notification functions associated with the identified events, and to determine the percentage of execution time based on the measured execution time over a sample time period.

Figure 8B:
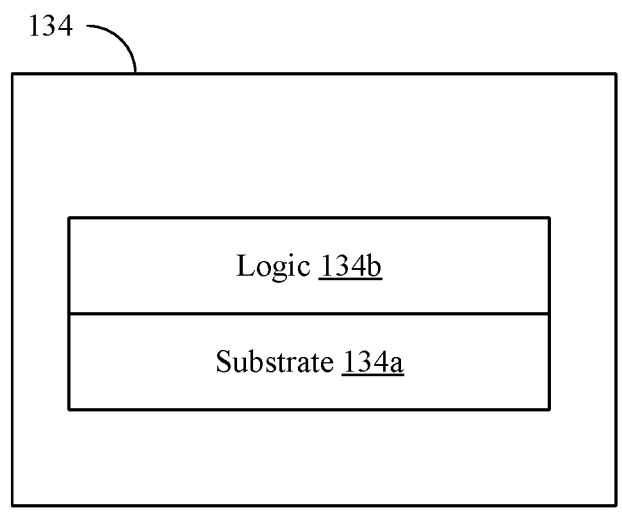

Turning now to FIG. 8B, boot management apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C), the method 60 (FIG. 6), and/or the method 70 (FIG. 7). Thus, the logic 134b may determine respective priority levels for one or more boot time events, and to determine an amount of execution time for the one or more boot time events. The logic 134b may also automatically adjust a timer based on the amount of execution time and the priority levels for the one or more boot time events. For example, the logic 134b may be configured to determine if one or more priority levels for the one or more boot time events corresponds to one or more raised priority levels, and the logic 134b may be configured to adjust a timer interrupt rate of the timer based on the amount of execution time for the one or more boot time events with raised priority levels. In some embodiments, the logic 134b may be further configured to determine a percentage of execution time for the one or more boot time events with raised priority levels, and the logic 134b may adjust the timer interrupt rate based on a comparison of the determined percentage of execution and one or more thresholds. For example, the logic 134b may be configured to increase the timer interrupt rate if the determined percentage of execution time is below a first threshold, and/or to decrease the timer interrupt rate if the determined percentage of execution time is above a second threshold. In some embodiments, the logic 134b may be further configured to monitor boot time events to identify events with one or more pre-determined event types, to measure the execution time for event notification functions associated with the identified events, and to determine the percentage of execution time based on the measured execution time over a sample time period. In one example, the apparatus 134 is a semiconductor die, chip and/or package.

Figure 9:
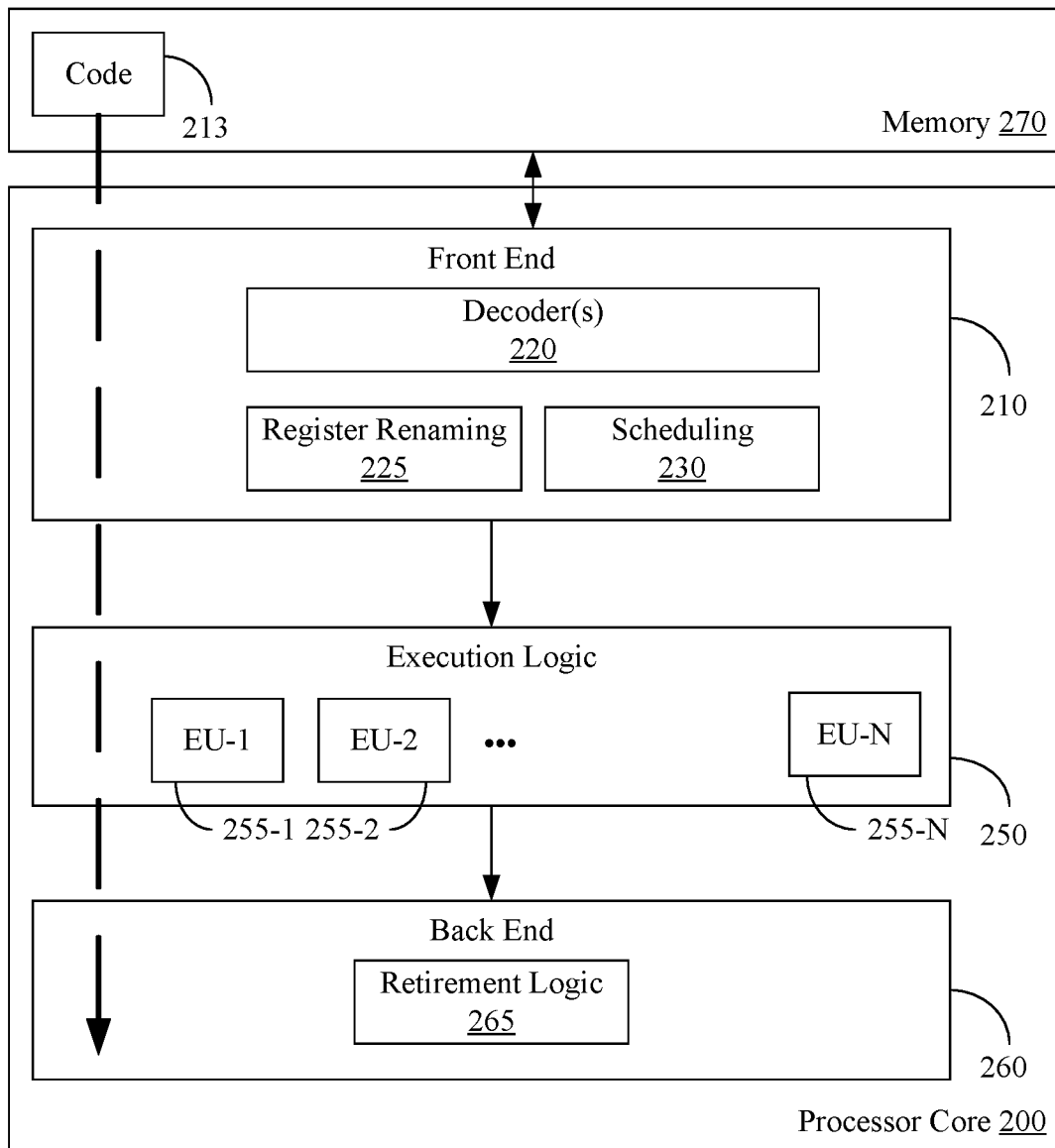
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C), the method 60 (FIG. 6), and/or the method 70 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
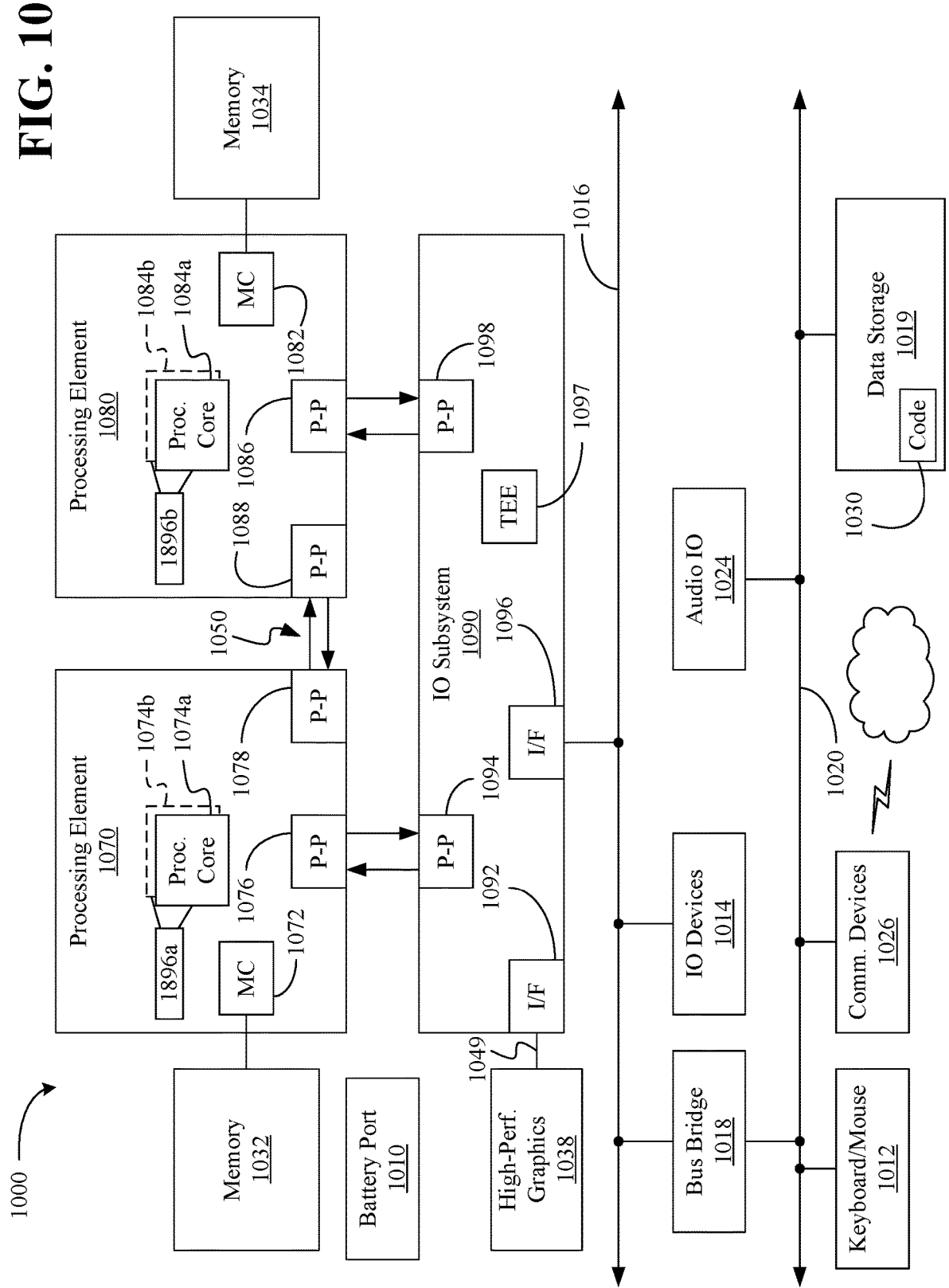
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C), the method 60 (FIG. 6), and/or the method 70 (FIG. 7), already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

Additional Notes and Examples

Example 1 may include an electronic processing system, comprising a processor, memory communicatively coupled to the processor, and logic communicatively coupled to the processor to determine respective priority levels for one or more boot time events, determine an amount of execution time for the one or more boot time events, and automatically adjust a timer based on the amount of execution time and the priority levels for the one or more boot time events.

Example 2 may include the system of Example 1, wherein the logic is further to determine if one or more priority levels for the one or more boot time events corresponds to one or more raised priority levels, and adjust a timer interrupt rate based on the amount of execution time for the one or more boot time events with raised priority levels.

Example 3 may include the system of Example 2, wherein the logic is further to determine a percentage of execution time for the one or more boot time events with raised priority levels, and adjust the timer interrupt rate based on a comparison of the determined percentage of execution and one or more thresholds.

Example 4 may include the system of Example 3, wherein the logic is further to increase the timer interrupt rate if the determined percentage of execution time is below a first threshold.

Example 5 may include the system of Example 3, wherein the logic is further to decrease the timer interrupt rate if the determined percentage of execution time is above a second threshold.

Example 6 may include the system of any of Examples 3 to 5, wherein the logic is further to monitor boot time events to identify events with one or more pre-determined event types, measure the execution time for event notification functions associated with the identified events, and determine the percentage of execution time based on the measured execution time over a sample time period.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine respective priority levels for one or more boot time events, determine an amount of execution time for the one or more boot time events, and automatically adjust a timer based on the amount of execution time and the priority levels for the one or more boot time events.

Example 8 may include the apparatus of Example 7, wherein the logic is further to determine if one or more priority levels for the one or more boot time events corresponds to one or more raised priority levels, and adjust a timer interrupt rate based on the amount of execution time for the one or more boot time events with raised priority levels.

Example 9 may include the apparatus of Example 8, wherein the logic is further to determine a percentage of execution time for the one or more boot time events with raised priority levels, and adjust the timer interrupt rate based on a comparison of the determined percentage of execution and one or more thresholds.

Example 10 may include the apparatus of Example 9, wherein the logic is further to increase the timer interrupt rate if the determined percentage of execution time is below a first threshold.

Example 11 may include the apparatus of Example 9, wherein the logic is further to decrease the timer interrupt rate if the determined percentage of execution time is above a second threshold.

Example 12 may include the apparatus of any of Examples 9 to 11, wherein the logic is further to monitor boot time events to identify events with one or more pre-determined event types, measure the execution time for event notification functions associated with the identified events, and determine the percentage of execution time based on the measured execution time over a sample time period.

Example 13 may include the apparatus of any of Examples 7 to 12, wherein the logic coupled to the one or more substrates includes transistor channel regions that are positioned within the one or more substrates.

Example 14 may include a method of managing boot events, comprising determining respective priority levels for one or more boot time events, determining an amount of execution time for the one or more boot time events, and automatically adjusting a timer based on the amount of execution time and the priority levels for the one or more boot time events.

Example 15 may include the method of Example 14, further comprising determining if one or more priority levels for the one or more boot time events corresponds to one or more raised priority levels, and adjusting a timer interrupt rate based on the amount of execution time for the one or more boot time events with raised priority levels.

Example 16 may include the method of Example 15, further comprising determining a percentage of execution time for the one or more boot time events with raised priority levels, and adjusting the timer interrupt rate based on a comparison of the determined percentage of execution and one or more thresholds.

Example 17 may include the method of Example 16, further comprising increasing the timer interrupt rate if the determined percentage of execution time is below a first threshold.

Example 18 may include the method of Example 16, further comprising decreasing the timer interrupt rate if the determined percentage of execution time is above a second threshold.

Example 19 may include the method of any of Examples 16 to 18, further comprising monitoring boot time events to identify events with one or more pre-determined event types, measuring the execution time for event notification functions associated with the identified events, and determining the percentage of execution time based on the measured execution time over a sample time period.

Example 20 may include at least one computer readable storage medium, comprising a set of instructions, which when executed by a computing device, cause the computing device to determine respective priority levels for one or more boot time events, determine an amount of execution time for the one or more boot time events, and automatically adjust a timer based on the amount of execution time and the priority levels for the one or more boot time events.

Example 21 may include the at least one computer readable storage medium of Example 20, comprising a further set of instructions, which when executed by the computing device, cause the computing device to determine if one or more priority levels for the one or more boot time events corresponds to one or more raised priority levels, and adjust a timer interrupt rate based on the amount of execution time for the one or more boot time events with raised priority levels.

Example 22 may include the at least one computer readable storage medium of Example 21, comprising a further set of instructions, which when executed by the computing device, cause the computing device to determine a percentage of execution time for the one or more boot time events with raised priority levels, and adjust the timer interrupt rate based on a comparison of the determined percentage of execution and one or more thresholds.

Example 23 may include the at least one computer readable storage medium of Example 22, comprising a further set of instructions, which when executed by the computing device, cause the computing device to increase the timer interrupt rate if the determined percentage of execution time is below a first threshold.

Example 24 may include the at least one computer readable storage medium of Example 22, comprising a further set of instructions, which when executed by the computing device, cause the computing device to decrease the timer interrupt rate if the determined percentage of execution time is above a second threshold.

Example 25 may include the at least one computer readable storage medium of any of Examples 22 to 24, comprising a further set of instructions, which when executed by the computing device, cause the computing device to monitor boot time events to identify events with one or more pre-determined event types, measure the execution time for event notification functions associated with the identified events, and determine the percentage of execution time based on the measured execution time over a sample time period.

Example 26 may include a boot manager apparatus, comprising means for determining respective priority levels for one or more boot time events, means for determining an amount of execution time for the one or more boot time events, and means for automatically adjusting a timer based on the amount of execution time and the priority levels for the one or more boot time events.

Example 27 may include the apparatus of Example 26, further comprising means for determining if one or more priority levels for the one or more boot time events corresponds to one or more raised priority levels, and means for adjusting a timer interrupt rate based on the amount of execution time for the one or more boot time events with raised priority levels.

Example 28 may include the apparatus of Example 27, further comprising means for determining a percentage of execution time for the one or more boot time events with raised priority levels, and means for adjusting the timer interrupt rate based on a comparison of the determined percentage of execution and one or more thresholds.

Example 29 may include the apparatus of Example 28, further comprising means for increasing the timer interrupt rate if the determined percentage of execution time is below a first threshold.

Example 30 may include the apparatus of Example 28, further comprising means for decreasing the timer interrupt rate if the determined percentage of execution time is above a second threshold.

Example 31 may include the apparatus of any of Examples 28 to 30, further comprising means for monitoring boot time events to identify events with one or more pre-determined event types, means for measuring the execution time for event notification functions associated with the identified events, and means for determining the percentage of execution time based on the measured execution time over a sample time period.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   memory communicatively coupled to the processor; and
   logic communicatively coupled to the processor to:
      determine respective priority levels for one or more boot time events,
      accumulate an amount of execution time that the one or more boot time events were processed over a sample time period,
      automatically adjust a timer based on the amount of the execution time and the priority levels for the one or more boot time events,
      determine a percentage of the execution time for the one or more boot time events, wherein the percentage is to correspond to the amount of the execution time for the one or more boot time events versus a total available processing time during the sample time period, and
      adjust a timer interrupt rate of the timer based on a comparison of the determined percentage of the execution time and one or more thresholds.

2. The system of claim 1, wherein the logic is further to: determine that one or more priority levels for the one or more boot time events corresponds to one or more raised priority levels.

3. The system of claim 1, wherein the logic is further to: increase the timer interrupt rate if the determined percentage of the execution time is below a first threshold.

4. The system of claim 1, wherein the logic is further to: decrease the timer interrupt rate if the determined percentage of the execution time is above a second threshold.

5. The system of claim 1, wherein the logic is further to: monitor boot time events to identify events with one or more pre-determined event types;
   measure execution time for event notification functions associated with the identified events; and
   determine the percentage of execution time based on the measured execution time for the event notification functions over the sample time period.

6. A semiconductor package apparatus, comprising:
   one or more substrates; and
   logic coupled to the one or more substrates, wherein the logic is at least partly implemented in one or more of configurable logic and fixed-functionality logic hardware, the logic coupled to the one or more substrates to:
      determine respective priority levels for one or more boot time events,
      accumulate an amount of execution time that the one or more boot time events were processed over a sample time period,
      automatically adjust a timer based on the amount of the execution time and the priority levels for the one or more boot time events,
      determine a percentage of the execution time for the one or more boot time events, wherein the percentage is to correspond to the amount of the execution time for the one or more boot time events versus a total available processing time during the sample time period, and
      adjust a timer interrupt rate of the timer based on a comparison of the determined percentage of the execution time and one or more thresholds.

7. The apparatus of claim 6, wherein the logic is further to:
   determine that one or more priority levels for the one or more boot time events corresponds to one or more raised priority levels.

8. The apparatus of claim 6, wherein the logic is further to:
   increase the timer interrupt rate if the determined percentage of the execution time is below a first threshold.

9. The apparatus of claim 6, wherein the logic is further to:
   decrease the timer interrupt rate if the determined percentage of the execution time is above a second threshold.

10. The apparatus of claim 6, wherein the logic is further to:
    monitor boot time events to identify events with one or more pre-determined event types;
    measure execution time for event notification functions associated with the identified events; and
    determine the percentage of the execution time based on the measured execution time for the event notification functions over the sample time period.

11. The apparatus of claim 6, wherein the logic coupled to the one or more substrates includes transistor channel regions that are positioned within the one or more substrates.

12. A method of managing boot events, comprising:
    determining respective priority levels for one or more boot time events;
    accumulating an amount of execution time that the one or more boot time events were processed over a sample time period;
    automatically adjusting a timer based on the amount of the execution time and the priority levels for the one or more boot time events;
    determining a percentage of the execution time for the one or more boot time events, wherein the percentage is to correspond to the amount of the execution time for the one or more boot time events versus a total available processing time during the sample time period; and
    adjusting a timer interrupt rate of the timer based on a comparison of the determined percentage of the execution time and one or more thresholds.

13. The method of claim 12, further comprising:
    determining that one or more priority levels for the one or more boot time events corresponds to one or more raised priority levels.

14. The method of claim 12, further comprising:
increasing the timer interrupt rate if the determined percentage of the execution time is below a first threshold.

15. The method of claim 12, further comprising:
decreasing the timer interrupt rate if the determined percentage of the execution time is above a second threshold.

16. The method of claim 12, further comprising:
monitoring boot time events to identify events with one or more pre-determined event types;
measuring execution time for event notification functions associated with the identified events; and
determining the percentage of the execution time for the event notification functions based on the measured execution time over the sample time period.

17. At least one computer readable storage medium, comprising a set of instructions, which when executed by a computing device, cause the computing device to:
determine respective priority levels for one or more boot time events;
accumulate an amount of execution time that the one or more boot time events were processed over a sample time period;
automatically adjust a timer based on the amount of the execution time and the priority levels for the one or more boot time events;
determine a percentage of the execution time for the one or more boot time events, wherein the percentage is to correspond to the amount of the execution time for the one or more boot time events versus a total available processing time during the sample time period; and
adjust a timer interrupt rate of the timer based on a comparison of the determined percentage of the execution time and one or more thresholds.

18. The at least one computer readable storage medium of claim 17, comprising a further set of instructions, which when executed by the computing device, cause the computing device to:
determine that one or more priority levels for the one or more boot time events corresponds to one or more raised priority levels.

19. The at least one computer readable storage medium of claim 17, comprising a further set of instructions, which when executed by the computing device, cause the computing device to:
increase the timer interrupt rate if the determined percentage of the execution time is below a first threshold.

20. The at least one computer readable storage medium of claim 17, comprising a further set of instructions, which when executed by the computing device, cause the computing device to:
decrease the timer interrupt rate if the determined percentage of the execution time is above a second threshold.

21. The at least one computer readable storage medium of claim 17, comprising a further set of instructions, which when executed by the computing device, cause the computing device to:
monitor boot time events to identify events with one or more pre-determined event types;
measure execution time for event notification functions associated with the identified events; and
determine the percentage of the execution time based on the measured execution time for the event notification functions over the sample time period.

* * * * *